United States Patent [19]

McKenzie

[11] 4,105,808

[45] Aug. 8, 1978

[54] PAINT COMPOSITION

[75] Inventor: Eugene L. McKenzie, North Saint Paul, Minn.

[73] Assignee: Minnesota Mining and Manufacturing Company, Saint Paul, Minn.

[21] Appl. No.: 695,053

[22] Filed: Jun. 11, 1976

Related U.S. Application Data

[63] Continuation of Ser. No. 188,448, Oct. 12, 1971, abandoned, which is a continuation of Ser. No. 547,450, May 4, 1966, abandoned.

[51] Int. Cl.$^2$ .................. C08L 77/08; C09D 5/00
[52] U.S. Cl. .................. 427/137; 260/18 PN; 260/18 TN; 260/22 CQ; 260/23 XA; 260/23.7 H; 260/830 P; 260/857 TW; 427/422
[58] Field of Search ........ 260/18 TN, 22 TN, 18 PN, 260/22 A, 22 CQ, 23 XA, 23.7 H, 859 R, 859 PV, 837 PV; 427/137

[56] References Cited

U.S. PATENT DOCUMENTS

| | | | |
|---|---|---|---|
| 2,795,565 | 6/1957 | Newey | 260/23 XA |
| 2,971,933 | 2/1961 | Beal | 260/23 XA |
| 4,031,048 | 6/1977 | Holmen | 260/37 N |

FOREIGN PATENT DOCUMENTS 1,197,783 7/1970 United Kingdom.

OTHER PUBLICATIONS

Lee, Epoxy Resins, Their Applications and Technology, McGraw-Hill, N. Y., 1957, pp. 166–172.
Nylen, Modern Surface Coatings, Wiley-Interscience, London, 1965, pp. 672–673.
"Versamid Technical Bulletin 11A", General Mills, 1955, pp. 6, 8, 9 and 10.

*Primary Examiner*—C. Warren Ivy
*Attorney, Agent, or Firm*—Cruzan Alexander; Donald M. Sell; Roger R. Tamte

[57] ABSTRACT

A paint composition for application at elevated temperatures to form markings on roadways that bear traffic rapidly. The composition includes a paint vehicle and a modifying material dispersed in subdivided form in the paint vehicle. The modifying material is solid and substantially insoluble in the paint vehicle at normal ambient temperatures, and forms an at least substantially dissolved sprayable liquid blend with the paint vehicle at elevated temperatures. As an example, a substantially neutral polyamide reaction product of a polymerized fatty acid and polyamine is dispersed in subdivided form in a paint vehicle that comprises resin-modified drying oils dissolved in a volatile liquid.

13 Claims, No Drawings

PAINT COMPOSITION

REFERENCE TO RELATED APPLICATION

This application is a continuation of copending application, Ser. No. 188,499, filed Oct. 12, 1971, now abandoned, and which itself was a continuation of Ser. No. 547,450, filed May 4, 1966 now abandoned.

The drying times of the most common present-day road marking paints are in the neighborhood of twenty minutes, though recent efforts have provided special processes and paints whereby a stripe that dries in as little as three to five minutes may be applied. However, both conventional and these more recent processes and paints are subject to essentially the same disadvantages. Traffic must still be rerouted from a lane being striped, since a stretch of wet paint approximately 2,500 to 4,500 feet long will be left by a road striping vehicle that is traveling 10 miles per hour and using paint that dries in 3–5 minutes. As a result, traffic has been impeded and drivers inconvenienced; and further, a large crew has often been required at some hazard to flag traffic or set out and pick up traffic cones.

The paint of the present invention largely eliminates these dissatisfactory aspects of the application of road paint. Preferred embodiments of the paint of this invention congeal less than 10 seconds after application. While the paint is not fully set or cured in this time, it is firm and nontacky and the tires of vehicles traveling over the painted marking will not pick up paint and transfer it or in some other way mar the marking. A stripe painted with a preferred paint of this invention by a vehicle traveling 10 miles per hour will be susceptible to damage or transfer of the paint for only about 150 feet behind the vehicle. As a result traffic can flow essentially uninterrupted, with the painted stripe being protected simply by a trailing vehicle or a sign on the road-striping truck.

The paint of this invention is to be distinguished from certain particulate compositions which have recently been developed and which form a pigmented marking on a roadway by coalescence of the melted particulate. These marking compositions are applied by procedures that involve preheating the road and applying the composition with a flame, and for purposes of this application are not strictly regarded as paints. The paint of this invention is applied by rather simple equipment without preheating or priming the road, typically through airless-spraying equipment mounted on a road-striping vehicle that travels at speeds up to 10 miles per hour and more.

The ten-second congealment time of preferred embodiments of this invention is far shorter than the congealment time of any other known road paint. While the congealment time of paints of this invention may be varied by changing the particular composition, by far the best results are produced in road painting for the reasons described above when the congealment time is less than 30–40 seconds and preferably less than 10–15 seconds. For other applications, paints of this invention are useful when exhibiting a congealment time somewhat longer.

In general, the paint of this invention comprises a mixture of (1) a paint vehicle that includes a nonvolatile organic film-forming paint binder and
   (a) is a liquid at normal ambient temperatures of about 40° F. and 110° F., but
   (b) forms a durable, adherent, unified nontacky paint film when applied as a thin coating and exposed to said normal ambient temperatures; and
(2) a film-forming, organic, thermoplastic, polymeric modifying material that comprises at least about 5 weight-percent of the nonvolatile organic ingredients in the paint composition and
   (a) is a solid at said normal ambient temperatures,
   (b) is substantially insoluble in the paint vehicle at said normal ambient temperatures, and
   (c) forms an at least substantially dissolved sprayable liquid blend with the paint vehicle at an elevated temperature above said range of normal ambient temperatures.

Pigments are generally included with this mixture to provide hiding ability and a desired color. Also, reflex-reflective elements--typically glass beads, but possibly crushed glass, or the like--are often included where it is desired to increase the paint's night visibility on a substrate such as a roadway. Reflective elements may, if desired, be dropped separately on an applied line instead of including them in the composition.

The optimum conditions of paint application and optimum paint composition vary somewhat with the temperature and nature of the substrate to be painted. For road paint, the particular tool formulation of paint vehicle, modifying material, and pigments, fillers, additives, and reflex-reflective elements is chosen to provide a material that will, in addition to congealing quickly on the road, wet the road well and advance to a durable adherent and unified film. After being heated to an elevated temperature useful for application and applied as a thin layer to a porous, coarse-grained substrate that is at a temperature substantially less than said elevated temperature, the paint of this invention (1) thoroughly wets the substrate, (2) rapidly becomes non-tacky and firm on the substrate, and (3) advances to a durable, adherent, unified film state on the substrate.

When painting roads, a useful elevated temperature to which to heat the paint of the invention for application of it generally falls within the range 150° F–300° F. If a paint were of a nature such that it were applicable at temperatures below 150° F., it would dry too slowly and perhaps soften after application on the roadway, especially on roadways that are in a region of hot climate. On the other hand, if a paint were not sufficiently fluid at temperatures below 300° F, there would be less likelihood that the paint would thoroughly wet and adhere to the road before it congealed. Also, higher temperatures of application, e.g. 400° or 500° F, which can be appropriate when painting substrates other than roadways, sometimes require complicated equipment and procedures in application.

The most suitable temperature within the range of 150° F to 300° F for application of the paint to a road will vary with the particular paint formulation and the road and the ambient temperature. One preferred road paint of this invention is converted into a substantially homogeneous liquid mixture of modifying material and paint vehicle at elevated temperatures as low as 180° F, and is typically applied when at a temperature between 200° F and 250° F. So that such a paint will not congeal before it sufficiently wets the road, it should preferably not be applied to roads that are at a temperature below about 40°–50° F. On the other hand, the temperature of the road should be substantially less, that is, about 50°–100° F less, than the application temperature of the paint, and at least about 30°–50° F less than the lowest elevated temperature at which the paint forms a substantially homogeneous liquid mixture or blend, in order to achieve fast drying.

Since wetting of a substrate by a liquid paint is generally associated with adhesion of the dried paint film, road paints of this invention should wet the road well. Adequate adhesion to a road can be predicted by a test in which the paint is first applied to small concrete patio blocks in approximately a 10-mil thickness, and then the congealed film sliced off with a razor blade down to the exterior level of the rather coarse-grained surface of the block. Where the paint has thoroughly wet the block, the open interstices of the slab will be revealed as filled rather uniformly with paint. Where there is insufficient wetting, the paint left in the block after the principal part of the film has been removed will present a rather splotchy pattern at best, with the open interstices for the most part not filled. In general, insufficient adhesion is indicated when less than 50 percent of the coated substrate viewed after slicing off of the principal part of the film is covered by paint.

The higher the viscosity of the paint at application, the more difficult it will be to spray out a smooth, even layer and the poorer will be the wetting of the substrate. For measuring wetting capacity, the viscosity and temperature of sprayed paint as it impinges on the substrate and the time rate at which these characteristics change are important considerations. However, it is presumed that for spray painting the viscosity of the paint as it leaves the nozzle and the temperature of the paint in the spray apparatus give valid indications of the performance of the paint. For purposes of this specification, viscosity and temperature "at application" are taken, in the case of spray painting, to mean viscosity at the nozzle and temperature in the spray apparatus. Since paints of this invention are often thixotropic, the viscosity varies with the degree of paint agitation and will vary substantially with the pressure at which paint is forced through a nozzle. In general, it will be difficult to spray a smooth layer of paint that wets the pavement well if the viscosity of the paint at application is much greater than 5,000 centipoises. Preferably the viscosity at application is less than 3,000 centipoises, and even more preferably less than 1,000 centipoises. For other procedures of paint application, such as dip coating, a different, generally lower, viscosity is desirable.

A wide variety of paint vehicles exhibit the necessary film-forming properties and necessary properties for combination with a modifying material for use in paints of this invention. Practically speaking, all the presently known useful paint vehicles include a resinous, film-forming binder and volatile organic solvent, and form a film by a curing reaction of the binder constituents and/or by the evaporation of solvent. The curing reactions are typified by air-drying, oxidation reactions in which an oxygen atom cross links the binder constituent molecules and by Diels-Alder reactions linking the binder constituent molecules through the unsaturated fatty acid portions of the molecules, and the reactions are generally catalyzed by driers such as metal naphthenates. The binder constituent must, of course, have the needed adhesive and cohesive properties for a particular paint use. After application of a thin layer of the paint of this invention and congealment of the paint, the constituents of the binder phase of the vehicle contribute to the advancement of the applied layer to a durable, adherent, and unified film.

A critical aspect of the paint vehicle is the miscibility of the modifying material in the vehicle. At temperatures of about the temperature of the substrate to be coated, the modifying material should be substantially insoluble in the paint vehicle. If the modifying material dissolves in the paint vehicle at the temperature of the substrate, which is typically at normal ambient temperature, the time for congealment of the paint on the substrate has been found to be too long. But where the modifying material is substantially insoluble at the temperature of the substrate and quickly congeals on the substrate when paint of the invention is applied as a thin layer, a traffic-bearing or handleable, non-tacky, dry-to-the-touch, film matrix is rapidly provided.

In contrast to its insolubility at normal ambient temperatures, the modifying material should form a substantially homogeneous, finely subdivided liquid mixture or blend at least approaching solution with the vehicle at an elevated temperature that is substantially above the temperature of the substrate and useful for application of the paint. As a result, when the paint is applied to the substrate at the elevated temperature the modifying material is thoroughly distributed throughout the layer. In some useful paints of this invention, however, the modifying material forms a lightly cloudy mixture with the paint vehicle at elevated temperature, indicating incomplete solution.

Well-known film-forming paint vehicles are typically included as the vehicle of the paint of this invention. In fact, useful paints of this invention are provided by adding particulate modifying material of the above described properties to already prepared conventional paints. Depending on the modifying material being used, some otherwise useful paint vehicles will be eliminated because of the activity of the solvent in the vehicle. For example, some lacquer-type paint vehicles are not useful in paints of this invention in combination with some typical modifying materials such as polyamides, since these paint vehicles include an active solvent that dissolves the polyamide at normal ambient temperatures. The most typically useful solvents in paint vehicles of paints of this invention are hydrocarbon solvents such as toluol, xylol, and naphtha. Nothwithstanding the above, lacquer-type organic binder phases of paint vehicles, such as vinyl toluene-butadiene copolymer (such as Marbon 1100 TMV which is a solution copolymer high in vinyl toluene) are satisfactorily included in paint of this invention. However, paint vehicles that form relatively insoluble films by a curing reaction such as a polymerization or oxidation reaction are more commonly employed in paints of the invention, and are usual employed for road marking in preference to lacquer vehicles.

The paint vehicles of conventional road paints are typical paint vehicles useful to incorporate in road paint of this invention. The binder in these road paints is often of a resin-modified drying oil composition. Tung oil is usually included to decrease drying time, and other drying oils such as linseed or castor oil are often used. These oils are usually modified with resins such as a phenolic or phenolic-modified resin or chlorinated rubber. Other typical binder constituents of road paints and of paint vehicles useful in paints of this invention are alkyds and oil-modified alkyds such as medium soya oil-phthalic anhydride alkyds. Additional useful binder constituents of this kind are polyurethane, urea, allyl, and epoxy resins and oil-modified varieties of them.

It will be noted that the paint vehicle must be somewhat chemically stable during the time period it is held at the elevated temperature for painting. Further, the paint vehicle and modifying material should be substantially inert with respect to one another at the elevated temperatures. Where the paints of this invention are to be sprayed from a closed system, the boiling point of solvent in the paint may nevertheless be below the temperature to which the paint is heated prior to application. The proportion of binder and solvent may be varied rather widely to control the viscosity of the paint before and during application. The solvent in most but not necessarily all cases, should not comprise much less than 10 percent of the paint of the invention; and it may comprise as much as 90–95 percent, preferably less than 80 percent.

The general characteristics noted above for the modifying material of the paint of this invention serve to define the useful materials. As noted, the useful modifying materials of paints of this invention are solids and substantially insoluble in the paint vehicle at normal ambient temperatures but form a substantially homogeneous liquid mixture or blend with the paint vehicle at elevated temperature. As the temperature of a thin layer of applied paint of the invention approaches the temperature of the substrate on which it is coated, a substantial amount of the modifying material in the paint rapidly segregates from the liquid ingredients as a solid phase that takes the form of a film matrix sufficiently firm and of such a nature as to support vehicular traffic and to be dry-to-the-touch.

As will be noted, the desired characteristics, such as the desired miscibility characteristics, of the modifying material depend somewhat on the nature of the paint vehicle with which it is to be combined. Miscibility can be discussed in terms of solubility perameters and hydrogen bonding characteristics (described in an article by H. H. Burrell in the October, 1955 issue of the Official Digest), which usually, but not always, provide an accurate basis for choice of materials. Usually a useful modifying material should, at normal ambient temperatures, have a narrow range of solubility parameters that does not encompass the solubility parameter of the solvent or solvent mixture in the paint vehicle. At an elevated temperature useful for application of the paint, the range of solubility parameters for the modifying material should usually be significantly enlarged so as to encompass the solubility parameter of the solvent or solvent mixture in the paint vehicle; or as stated above, the modifying material should approach a solution or dissolved state in the paint vehicle at the elevated temperature. The modifying material should exhibit these solubility characteristics with respect to solvents that dissolve useful paint binders, and preferably should exhibit these characteristics with respect to conventional paint solvents.

As a rule the modifying material should have a low melt viscosity and should exhibit a rather low molecular weight. Preferably the modifying material has a rather narrow range of temperatures at which it melts of about 50° F or less, and the melting range should be substantially above the temperature of the substrate to be coated, but desirably below the intended temperature of paint application.

Some modifying materials having the desired solubility, melting, viscosity, and film-forming characteristics useful in this invention are polyamides and ethylene-based polymers. For example, low-molecular-weight polyamide reaction products of dimerized unsaturated fatty acids and alkylene diamines such as ethylene diamine have been found especially useful for mixture with conventional road paint vehicles incorporating a hydrocarbon solvent. Some typical ones of these useful polymers have a molecular weight in the neighborhood of 2,000–3,000, a melting point of about 200° F by the ball and ring method, and a melt viscosity at 240° F of about 5,000 centipoises. Most often, the modifying materials useful in preferred road paints of this invention will have roughly similar values for these characteristics, and be insoluble in a hydrocarbon solvent in the paint at normal ambient temperatures but miscible with the solvent at elevated temperatures. The modifying material may be a single resin or a mixture of resins designed to achieve particular viscosity or melting characteristics.

The modifying material is often melted and blended with pigments, fillers, and additives as well as reflex-reflective elements and then cooled and pulverized to form a solid particulate material for mixture with the paint vehicle. The particulate material is generally included in powder form that passes a 40-mesh screen (U.S. Standard) but gives satisfactory results when rather coarse and chunky with a diameter size up to about $\frac{1}{4}$ inch or more. At sizes above $\frac{1}{4}$ inch, it has been found that the paint is difficult to handle. Quite fine powder may be used, though the paint may become too viscous for convenient handling at ambient temperature if too fine powders are added (e.g. smaller than about 325 mesh U.S. Standard). Typically the paint of the invention may be heated, cooled, and then reheated and used. In the cooled state after heating, the paint exists as a somewhat gelatinous material in which the modifying material is very finely subdivided, and the paint may be made available commercially in this condition.

The particular proportion of paint vehicle and modifying material varies somewhat with the particular ingredients used. The amount of modifying material should not be so large that the paint does not exhibit the necessary viscosity, especially at application. On the other hand, the modifying material must be included in amounts sufficient to rapidly provide a firm, non-tacky gel structure of some strength and unity upon application of the paint. Usually, the range of useful proportions of modifying material to the other nonvolatile organic ingredients or organic solids of the paint (organic binder solids and the solids of organic additives) roughly centers around a one-to-one ratio. Rather wide variations, however, are possible, especially with variations in the particular ingredients and in the particular job for which the paint is intended. Generally, the modifying material comprises at least 5 weight-percent and usually between about 20 to 80 weight-percent of the total organic solids, with the percentage in preferred road paints generally falling in the range of 30 to 70 percent.

In road paints of this invention yellow or white coloring pigments are typically added in an amount of at least about 20 parts and no more than about 450–500 parts by weight per 100 parts of the total organic solids or nonvolatile organic ingredients in the paint. Fillers and additives are also generally included in the paint to extend it and to achieve particular effects. Because of the expense of coloring pigments, they are usually added in an amount up to about 50 parts per 100 parts organic solids, and the paint is further extended with more inexpensive and specialized fillers, such as reinforcing and antisettling fillers. In general, when pigments, reflex-reflective elements, fillers, and the like are included in the paint, they are added in a proportion of no more than about 450–500 parts per 100 parts of the total organic solids in the paint, the proportion being somewhat lower where very fine pigments and fillers are used.

The invention is further illustrated by the following examples:

EXAMPLE I

In the novel paint of this example, the paint vehicle (a resin-modified drying oil vehicle) plus reflex-reflective elements and fillers and part of the pigment and additives were provided by a conventional traffic paint that included the following ingredients mixed in a manner known to those skilled in the art:

|  | Parts by Weight |
| --- | --- |
| Phenolic-modified pentaerythritol ester of resin having an acid number of 17, a softening point of 333° F (167° C), and a viscosity in a 50% solution of toluene of F onthe Gardner-Holdt scale at 25° C (Pentalyn 802 A) | 3.6 |
| Linseed oil | 3.6 |
| Tung oil | 3.6 |
| Chlorinated rubber having a chlorine content of 67% and having a viscosity of 17–25 centipoises (Parlon S-20) | 2.7 |
| Lecithin pigment dispersant (70 percent solution in a mixture of naphtha and xylol) | 0.4 |
| Dimethyldioctadecyl ammonium bentonite thixotropic agent | 0.4 |
| Glass beads (70 mesh; refractive index of glass, 1.5) | 32.1 |
| Finely divided magnesium silicate reinforcing filler | 6.1 |
| Extended titanium dioxide pigment | 25.4 |
| Oxime-type antiskinning agent | 0.1 |
| Epichlorohydrin | 0.05 |
| Diglycidyl ether of bisphenol A having an epoxide equivalent weight of 180–195 and a viscosity at 25° C of 100–160 poises (Epon 828) | 0.1 |
| Toluol Solvent | 13.7 |
| Heptane solvent | 6.4 |
| Methanol solvent | 0.1 |
| Metal naphthenate driers in dilute solution in mineral spirits | 0.4 |

The modifying material in the novel paint of this example comprised a mixture of two polyamide resins. The first (Versamid 725) is believed to be a condensation reaction product of a dimerized drying oil acid and an alkylene diamine such as ethylene diamine. The molecular weight of this polymer is about 2,100; its amine value is 4; its melting point by the ball and ring method is about 230° F; and its melt viscosity at 300° F is about 700–1,100 centipoises and at 250° F is about 5,600 centipoises. The second (Versamid 950) is the condensation reaction product of dimerized fatty acid of linseed oil, monomeric fatty acid, and ethylene diamine and is plasticized by the inclusion of a blend of ortho- and para-N-ethyl-toluene sulfonamides in an amount comprising 5–15 percent of whole mixture. The condensation product before plasticizing has a molecular weight of about 3,000 and an amine value of 4. The plasticized polyamide melts at about 196° F as measured by the ball and ring method and from 183° F to 201° F by the capillary tube method. It exhibits a viscosity at 300° F of about 825 centipoises and at 250° F of about 3,000 centipoises.

To these modifying materials were added materials somewhat altering their viscosity and wetting characteristics. These included first of all, a polyketone resin (Mohawk MR-60) which is a condensation product of formaldehyde with cyclohexanone and has a molecular weight of approximately 500 and a melting point of 164° F by the ball and ring method. Also added was a chlorinated naphthalene (Halowax 1001) which is a mixture of tri- and tetrachloronaphthalenes. It is a white crystalline wax-like solid with about 50 percent chlorine content and has a molecular weight of about 255 and a melting point of about 200° F according to the ball and ring method. Silicone oil, a clear, water-white dimethyl polysiloxane fluid sold as Dow Corning 200 fluid was also included to improve the wetting characteristics of the composition.

The modifying materials and the above additives together with pigment were included in the following proportion:

|  | Parts by Weight |
| --- | --- |
| Versamid 725 | 28.6 |
| Versamid 950 | 28.6 |
| Chlorinated naphthalene | 2.9 |
| Polyketone resin | 8.5 |
| Silicone oil | 0.03 |
| Rutile titanium dioxide pigment | 31.4 |

These ingredients were melted and added in the order listed to a stainless steel kettle with the temperature held at about 260° F. The mixture was recirculated through a blender for approximately one-half hour and then poured into stainless steel flat trays in about a one-inch thickness. When cool, the blended material was ground up and screened, with the particulate material passed by a 40-mesh screen (U.S. Standard) being retained. This particulate material melted at about 210° F as measured by the ball and ring method. At 300° F the melt viscosity of the material was about 1,500 centipoises and at 240° F about 5,400 centipoises.

The particulate material passed by the 40-mesh screen was then blended in a paint blender with the conventional paint described above in a ratio of about 30 parts by weight of particulate material to 105 parts of paint. It will be noted that the modifying material (polyamides) comprised about 48 weight-percent of the total of the organic solids phase (consisting of the modifying material, the paint vehicle binder solids; i.e. phenolic-modified pentaerythritol ester of rosin, linseed oil, tung oil, and chlorinated rubber, and the organic solids in additives mixed with the modifying material and conventional paint).

A small amount of this paint was charged to a 3-inch-diameter, 9-inch-long cylindrical dispenser having a pressure gauge and bleed-off valve at one end and a narrow application slot at the other end closed with a removable plug. The paint was heated in the dispenser to about 240° F and then applied through the narrow slot in a 6-inch-wide strip on a small concrete patio block. Since somewhat of an excess of paint was applied with this crude dispenser, immediately after application the excess paint above an approximate 10-mil thickness was wiped from the block with a glass plate. By a thumb pressure test it was found that the paint was firm and not tacky in less than 10 seconds. (It has been found that this thumb pressure test gives a good indication of the traffic bearing capability of the painted stripe. The same paint of this example was also applied to concrete floors and roads with airless-spraying equipment, and automobiles accelerating from a standing start were driven over the painted line about 10 seconds after the paint was applied without picking up paint or damaging the line). A few minutes after application of the paint, a short length of the coated film was sliced off down to the concrete with a razor blade. This test revealed good wetting of the slab, with substantially 100 percent of the sliced-off surface covered with paint.

The coated block was then heated in an oven at 120° F for more than 3 days, then soaked in a tank of water for one day, and then placed in a cold room and brought down to −10° F. The painted stripe was then subjected to an abrasion test in which ceramic balls, ¼ inch in diameter and on the average about 0.85 gram in weight, were dropped repeatedly through a one-inch-diameter, three-feet-long vertical tube arranged above the slab, with the slab inclined at an angle of 45° to the horizontal. The first chip in the paint occurred after about the 880th ball and the paint was not removed from all of the struck surface until after the 1,900th ball, indicating high resistance to damage by traffic.

While in the formulation of this example described above the modifying material comprised 48 percent of the organic solids phase of the paint, other paints using the same ingredients but in different proportions also gave satisfactory results. For example, paint compositions of this invention were prepared using the described particulate material and the conventional paint of this example (without the glass beads) in proportions ranging from about 25 to 40 parts modifying material and 75 to 60 parts conventional paint. In these paints, the percentage of modifying material in the total organic solids of the final paint ranged from about 45 percent to about 65 percent; but the range for useful results is even broader.

EXAMPLE II

In this example the 40-mesh particulate material used in Example I was mixed with a different conventional road paint. This paint was based on an oil-modified polyurethane resin (Spenkel F 78), which is the reaction product of glycerolized linseed oil with ditolyl diisocyanate. More specifically, this conventional traffic paint composition included the following ingredients mixed in a manner known to the art:

| | Parts by Weight |
|---|---|
| Polyurethane above described (50 percent by weight solids in a hydrocarbon solvent) | 37.3 |
| Extended titanium dioxide pigment | 16.7 |
| Rutile titanium dioxide pigment | 16.7 |
| Finely divided magnesium silicate reinforcing filler | 6.2 |
| Diatomaceous silica antisettling filler | 6.2 |
| Mica reinforcing filler | 6.2 |
| Metal naphthenate driers in dilute solution in mineral spirits | 0.3 |
| Naphtha | 10.4 |

Fifteen parts by weight of the particulate material of Example I and 85 parts of the above paint were blended in a paint blender with 50 parts of 70 mesh glass beads. With these proportions, the modifying material comprised 33 weight-percent of the total organic solids phase of the paint. This mixture was then applied to a concrete block in an approximate 10-mil thickness using the dispenser and method and approximate temperture described in Example I. Tack-free time was measured as 8 seconds. The wetting test indicated substantially 100- percent coverage. The painted block was then subjected to the conditioning described in Example I, and tested for abrasion. The first chip occurred after about the 750th ball, and the paint was not completely chipped away until after about the 1,750th ball, again showing high resistance to damage by traffic.

EXAMPLE III

A conventional traffic paint based on a medium oil-modified alkyd was prepared by mixing the following ingredients in the order listed:

| | Parts by Weight |
|---|---|
| Medium soya oil-phthalic anhydride alkyl resin comprising 56 weight percent soya oil (Beckosol 31) | 15.7 |
| Naphtha | 11.7 |
| Toluol | 11.7 |
| Extended titanium dioxide pigment | 48.5 |
| Calcium carbonate extending filler | 6.0 |
| Finely divided magnesium silicate reinforcing filler | 6.0 |
| Metal naphthenate driers in dilute solution in mineral spirits | 0.3 |
| Oxime antiskinning agent | 0.1 |

To 75 parts by weight of this paint, 25 parts of the 40-mesh particulate material of Example I were added. In these proportions the modifying material comprised 49 weight-percent of the total of the organic solids phase of the paint. The resulting paint was applied at about 220° to 240° F to a concrete patio block and tested by the procedure of Example I. The film exhibited a tack-free time of 10 seconds and a coverage of substantially 100 percent in the wetting test. It chipped after about the 820th ball and the paint was not completely removed until after about the 3,400th ball.

EXAMPLE IV

The conventional paint base described in Example I was mixed with 40-mesh powder of a long chain polyamide of low molecular weight that has a Durran's mercury method melting point of 205° F and a viscosity in a 40-weight percent solution in anhydrous isopropanol of 120 centipoises (Sunkem Nylon 526 G). They were mixed in a weight ratio of 90 to 10 respectively, with 5 parts of toluol added. In these proportions the modifying material comprised 43 weight-percent of the total of the organic solids phase of the paint. This composition was then applied at a temperature of about 220° F to a concrete patio block and tested by the method described in Example I. The film exhibited a tack-free time of 7 secnds, and a coverage of substantially 100 percent in the wetting test. It chipped after about the 650th ball and the paint was not completely removed until after about the 1,750th ball.

EXAMPLE V

The conventional paint base described in Example I was mixed with 6- to 8-mesh powder of a wax-compatible ethylenevinyl acetate copolymer (Elvax 420) in which the vinyl acetate content is 18 percent by weight. This copolymer has a melting point by the ball and ring method of 210° F, a melt index between 125 and 175, and an inherent viscosity of 0.54. The paint and copolymer were mixed in a weight ratio of 90 to 10, with 5 parts of xylol added. In this proportion the modifying material constituted 43 weight-percent of the total oganic solids phase of the paint. The composition of this example was then applied at a temperature of about 220° F to a small concrete block and tested by the method described in Example I. The coated film exhibited a tack-free time of about 10 seconds, and a coverage of about 80 percent in the wetting test. It chipped after about the 1,800th ball and the paint was not completely removed until after the 2,900th ball.

In contrast to the above examples in which, before application of the novel paint, the paint vehicle exists as a continuous, single phase, the paint vehicle in some embodiments of the invention is originally in two phases and does not become a single-phase material that forms a durable adherent unified film until application of the paint. For example, in one embodiment of the invention, the paint vehicle comprises two reactant parts that together form a hard film, one part containing reactive epoxy groups and the other including a hardening agent reactive with the epoxy groups. The two parts of the paint vehicle are maintained as separate phases during storage and up to the time of application of the paint by encapsulation of typically the hardening agent. In one variation of this embodiment, the capsule shell comprises a modifying material, as described herein, miscible with the paint vehicle at a useful elevated temperature.

While the paint of this invention has been described principally in connection with road painting, the paint has other more general applications. For example, it has application in industrial uses where quick handling of the painted article is necessary. A principal use of this kind is with steel articles given a rust preventativde coating after milling. Both spray and dip procedures of application are possible. As indicated above, the particular formation of such an industrial paint will vary from that described for road painting depending on the particular ambient conditions, the article coated, and the method of coating chosen. The paint formulation will, however, follow the teachings of this invention as to the modification of organic paint vehicles with modifying materials that form a substantially homogeneous liquid mixture with the vehicle at elevated temperatures and form a non-tacky film matrix at lower temperatures. It is contemplated that new materials will become available possessing properties making them useful in paint formulations devised according to the teachings of this invention; and the use of such materials as taught herein is regarded also as within the scope of this invention.

What is claimed is:

1. A paint composition that rapidly congeals to traffic-bearing condition when sprayed at an elevated temperature onto a roadway comprising
    (1) a paint vehicle that includes a nonvolatile organic film-forming paint binder and a volatile solvent in which the binder is dissolved and that
        (a) is a liquid at normal ambient temperatures of 40° F to 110° F, but
        (b) forms a durable adherent unified tough nontacky paint film when applied as a thin coating and exposed to said normal ambient temperatures; and
    (2) a film-forming substantially neutral thermoplastic polyamide reaction product of a polymerized fatty acid and a polyamine mixed in said paint vehicle and accounting for at least about 5 weight-percent of the nonvolatile organic ingredients of the paint composition, which polyamide
        (a) is a solid at said normal ambient temperatures,
        (b) is insoluble in the paint vehicle at said normal ambient temperatures,
        (c) dissolves in the paint vehicle at an elevated temperature that is above said range of normal ambient temperatures but is less than 500° F to form a sprayable solution having a viscosity less than 5000 centipoises, and
        (d) forms, in combination with said paint vehicle, a firm nontacky adherent film rapidly after said solution of the two is applied at said elevated temperature as a thin coating to a substrate that is at a said normal ambient temperature; and
    (3) pigments in an amount sufficient to color the paint composition.

2. A paint composition of claim 1 in which the paint vehicle comprises a film-forming binder selected from the group consisting of drying oils, alkyds, polyurethanes, epoxy resins, and oil-modified varieties of such binders.

3. A paint composition of claim 1 that includes reflex-reflective elements to make applied markings reflex-reflective.

4. A paint composition of claim 1 in which the reaction product comprises at least about 20 weight-percent of the nonvolatile organic ingredients in the composition.

5. A paint composition that rapidly congeals to traffic-bearing condition when sprayed at an elevated temperature onto a roadway comprising
    (1) a paint vehicle that includes a nonvolatile organic film-forming paint binder and a volatile solvent in which the binder is dissolved and that
        (a) is a liquid at normal ambient temperatures of 40° F to 110° F, but
        (b) forms a durable adherent unified tough nontacky cured paint film when applied as a thin coating and exposed to said normal ambient temperatures;
    (2) a film-forming thermoplastic substantially neutral polyamide reaction product of polymerized fatty acid and polyamine mixed in said paint vehicle and accounting for at least about 20 weight-percent of the nonvolatile organic ingredients of the paint composition, which reaction product
        (a) is a solid at said normal ambient temperatures,
        (b) is insoluble in the paint vehicle at said normal ambient temperatures,
        (c) dissolves in the paint vehicle at an elevated temperature that is above said range of normal ambient temperatures but is less than 500° F to form a sprayable solution having a viscosity less than 1000 centipoises, and
        (d) forms, in combination with said paint vehicle, a firm nontacky adherent film rapidly after said solution of the two is applied at said elevated temperature as a thin coating to a substrate that is at a said normal ambient temperature; and
    (3) pigments in an amount sufficient to color the paint composition.

6. A paint composition of claim 5 in which the paint vehicle comprises a film-forming binder selected from drying oils, alkyd resins, polyurethane resins, and epoxy resins.

7. A paint composition of claim 5 in which the reaction product comprises between about 30 and 70 weight-percent of the nonvolatile organic ingredients of the paint composition.

8. A paint composition of claim 5 that includes reflex-reflective elements to make applied markings reflex-reflective.

9. A method for forming a paint marking on a roadway that bears traffic rapidly after application comprising (I) heating in a closed system to a predetermined elevated temperature that is above the range of normal ambient temperatures of 40° F to 110° F but is less than 500° F a paint composition that comprises (A) in mixture as two phases
  (1) a paint vehicle that includes a nonvolatile organic film-forming paint binder and that
    (a) is a liquid at said normal ambient temperatures, but
    (b) forms a durable adherent unified tough non-tacky paint film when applied as a thin coating and exposed to said normal ambient temperatures and
  (2) a film-forming thermoplastic substantially neutral polyamide reaction product of a polymerized fatty acid and a polyamine mixed in said paint vehicle and accounting for at least about 5 weight-percent of the nonvolatile organic ingredients of the paint composition, which polyamide
    (a) is a solid at said normal ambient temperatures,
    (b) is insoluble in the paint vehicle at said normal ambient temperatures,
    (c) dissolves in said paint vehicle at said predetermined elevated temperature to form a sprayable solution having a viscosity of less than 5000 centipoises, and
    (d) forms, in combination with said paint vehicle, a firm nontacky adherent film rapidly after said solution of the two is applied at said elevated temperature as a thin coating to a substrate that is a a said normal ambient temperature; and
(B) pigments in an amount sufficient to color the paint composition; and
(II) coating the paint composition on the roadway while it is at said elevated temperature.

10. A method of claim 9 in which the paint vehicle comprises a film-forming binder selected from the group consisting of drying oils, alkyds, polyurethanes, epoxy resins, and oil-modified varieties of such binders.

11. A method of claim 9 in which the reaction product comprises at least about 20 weight-percent of the nonvolatile organic ingredients of the paint.

12. A method of claim 9 in which the reaction product comprises between about 30 and 70 weight-percent of the nonvolatile organic ingredients of the paint composition.

13. A method of claim 9 in which the paint composition is applied with reflex-reflective elements to make applied markings reflex-reflective.

* * * * *